United States Patent
Park et al.

(10) Patent No.: US 9,104,584 B2
(45) Date of Patent: Aug. 11, 2015

(54) APPARATUS AND METHOD FOR PERFORMING A COMPLEX NUMBER OPERATION USING A SINGLE INSTRUCTION MULTIPLE DATA (SIMD) ARCHITECTURE

(75) Inventors: Young Hwan Park, Yongin-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 855 days.

(21) Appl. No.: 13/210,455

(22) Filed: Aug. 16, 2011

(65) Prior Publication Data

US 2012/0173600 A1    Jul. 5, 2012

(30) Foreign Application Priority Data

Dec. 30, 2010 (KR) .................. 10-2010-0139027

(51) Int. Cl.
*G06F 7/48*      (2006.01)
*G06F 9/38*      (2006.01)
*G06F 17/10*     (2006.01)
*G06F 9/30*      (2006.01)

(52) U.S. Cl.
CPC .............. *G06F 17/10* (2013.01); *G06F 7/4812* (2013.01); *G06F 9/30014* (2013.01); *G06F 9/3887* (2013.01)

(58) Field of Classification Search
CPC ... G06F 7/4806; G06F 7/4812; G06F 7/4824; G06F 9/3887
USPC .................................. 708/511, 622
See application file for complete search history.

(56) References Cited

U.S. PATENT DOCUMENTS

| | | | |
|---|---|---|---|
| 2005/0071403 A1 | 3/2005 | Taunton | |
| 2009/0055455 A1* | 2/2009 | Matsuyama et al. | 708/231 |
| 2009/0077154 A1* | 3/2009 | Matsuyama et al. | 708/523 |
| 2010/0274990 A1* | 10/2010 | Wilder et al. | 712/22 |

FOREIGN PATENT DOCUMENTS

| | | |
|---|---|---|
| JP | 2000-122999 | 4/2000 |
| KR | 10-2002-0035739 | 5/2002 |
| KR | 10-2003-0084554 | 11/2003 |
| KR | 10-2005-0036698 | 4/2005 |
| KR | 10-2006-0135642 | 12/2006 |
| KR | 10-2008-0042818 | 5/2008 |
| KR | 10-2008-0042837 | 5/2008 |
| KR | 10-2009-0071823 | 7/2009 |

* cited by examiner

Primary Examiner — Chuong D Ngo
(74) Attorney, Agent, or Firm — NSIP Law

(57) ABSTRACT

Provided are an apparatus and method for performing a complex number operation using a Single Instruction Multiple Data (SIMD) architecture. A SIMD operation apparatus may perform, in parallel, a real part operation and an imaginary part operation of a plurality of complex numbers. The real part operation and the imaginary part operation may be performed sequentially, or in parallel.

17 Claims, 9 Drawing Sheets

$\underbrace{h(0)x(n)+h(1)x(n-1)}_{510} + \underbrace{h(2)x(n-2)+h(3)x(n-3)}_{520} + ... + h(N-1)x(n-N+1)$

APPARATUS AND METHOD FOR PERFORMING A COMPLEX NUMBER OPERATION USING A SINGLE INSTRUCTION MULTIPLE DATA (SIMD) ARCHITECTURE

CROSS-REFERENCE TO RELATED APPLICATION(S)

This application claims the benefit under 35 U.S.C. §119(a) of Korean Patent Application No. 10-2010-0139027, filed on Dec. 30, 2010, in the Korean Intellectual Property Office, the entire disclosure of which is incorporated herein by reference.

BACKGROUND

1. Field

The following description relates to a method and apparatus for performing a complex number operation using a Single Instruction Multiple Data (SIMD) architecture, and in addition, to an apparatus and method for performing a predetermined complex number operation through SIMD parallel processing.

2. Description of Related Art

A Single Instruction Multiple Data (SIMD) is a class of parallel computing that is used to process multiple data under a single instruction. SIMD is applicable to a multimedia field or a communication field. SIMD enables multiple operation apparatuses to simultaneously process multiple data by applying the same operation or similar operations to the multiple data. Generally, SIMD is used in a vector processor.

SIMD computer architecture uses Data Level Parallelism (DLP). In an N-way SIMD architecture, N pieces of data are processed in parallel, and N operation result values are generated. If the same number of output values are generated as the number of input values, the size of the output values, that is a number of bits of the output values, may be equal to the size of the input values.

In an example in which a multiplication operation is performed by the SIMD, an output value generated by the multiplication operation may have a size that is twice as many significant bits as an input value. However, because the size of the input value is equal to the size of the output value as described above, a quantization error may occur in the output value.

SUMMARY

In one general aspect, there is provided a Single Instruction Multiple Data (SIMD) operation apparatus, including at least one complex number operator to perform a first operation, a second operation, and a third operation based on a first complex number, a second complex number, a third complex number, and a fourth complex number, wherein the first operation is performed to calculate, in parallel, a first product, a second product, a third product, and a fourth product, by multiplying two numbers at a time from among eight numbers, and the eight numbers respectively represent a real part and an imaginary part of the first complex number, a real part and an imaginary part of the second complex number, a real part and an imaginary part of the third complex number, and a real part and an imaginary part of the fourth complex number, the second operation is performed to calculate, in parallel, a first sum of the first product and the third product, and a second sum of the second product and the fourth product, and the third operation is performed to generate, as a result value, either a value obtained by adding the first sum and the second sum, or a value obtained by subtracting the second sum from the first sum.

The SIMD operation apparatus may perform a function of a Finite Impulse Response (FIR) filter.

One complex number operator from among the at least one complex number operators may simultaneously perform an operation on values of two taps of the FIR filter.

The first operation, the second operation, and the third operation may be sequentially performed by executing a single instruction in the SIMD operation apparatus.

The real part and imaginary part of the first complex number, the real part and imaginary part of the second complex number, the real part and imaginary part of the third complex number, and the real part and imaginary part of the fourth complex number may include fixed-point values.

The real part and imaginary part of the first complex number, the real part and imaginary part of the second complex number, the real part and imaginary part of the third complex number, and the real part and imaginary part of the fourth complex number may each include n bits, and the first product, the second product, the third product, the fourth product, the first sum, the second sum, and the result value may each include 2n bits.

The at least one complex number operator may sequentially perform the first operation, the second operation, and the third operation, to calculate a real part of a value obtained by adding a product of the first complex number and the second complex number, and a product of the third complex number and the fourth complex number, the first operation may be performed to calculate, in parallel, a first product of the real part of the first complex number and the real part of the third complex number, a second product of the imaginary part of the first complex number and the imaginary part of the third complex number, a third product of the real part of the second complex number and the real part of the fourth complex number, and a fourth product of the imaginary part of the second complex number and the imaginary part of the fourth complex number, and the third operation may be performed to generate a result value that is obtained by subtracting the second sum from the first sum.

The at least one complex number operator may sequentially perform the first operation, the second operation, and the third operation, to calculate an imaginary part of a value obtained by adding a product of the first complex number and the second complex number, and a product of the third complex number and the fourth complex number, the first operation may be performed to calculate, in parallel, a first product of the real part of the first complex number and the imaginary part of the third complex number, a second product of the imaginary part of the first complex number and the real part of the third complex number, a third product of the real part of the second complex number and the imaginary part of the fourth complex number, and a fourth product of the imaginary part of the second complex number and the real part of the fourth complex number, and the third operation may be performed to generate a result value that is obtained by adding the second sum and the first sum.

A first complex number operator from among the at least one complex number operators may calculate a real part of a value obtained by adding a product of the first complex number and the second complex number to a product of the third complex number and the fourth complex number, and a second complex number operator from among the at least one complex number operators may calculate an imaginary part of the value obtained by adding the product of the first complex number and the second complex number to the product of the third complex number and the fourth complex number, and a first operation of the first complex number operator and a first operation of the second complex number operator may be performed in parallel, a second operation of the first complex number operator and a second operation of the second complex number operator may be performed in parallel, and a third operation of the first complex number operator, and a third operation of the second complex number operator may be performed in parallel.

The SIMD operation apparatus may further comprise at least one accumulator, wherein the at least one accumulator is used as either a real part accumulator or an imaginary part accumulator, and a first real part accumulator stores a result value of the first complex number operator, and a first imaginary part accumulator stores a result value of the second complex number operator.

The at least one complex number operator may sequentially calculate, as a first result value, a real part of a value that is obtained by adding a product of the first complex number and the second complex number to a product of the third complex number and the fourth complex number, and may calculate, as a second result value, an imaginary part of the value that is obtained by adding the product of the first complex number and the second complex number to the product of the third complex number and the fourth complex number.

In another aspect, there is provided a method of operating a complex number, the method including a real part intermediate product calculation operation by which a Single Instruction Multiple Data (SIMD) processing apparatus calculates, in parallel, a first real part product, a second real part product, a third real part product, and a fourth real part product, based on a first complex number, a second complex number, a third complex number, and a fourth complex number, a real part intermediate sum calculation operation by which the SIMD processing apparatus calculates a first real part sum and a second real part sum, based on the first real part product, the second real part product, the third real part product, and the fourth real part product, and a real part result value calculation operation by which the SIMD processing apparatus calculates a real part result value based on the first real part sum and the second real part sum, wherein the first real part product is obtained by multiplying a real part of the first complex number and a real part of the third complex number, the second real part product is obtained by multiplying an imaginary part of the first complex number and an imaginary part of the third complex number, the third real part product is obtained by multiplying a real part of the second complex number and a real part of the fourth complex number, and the fourth real part product is obtained by multiplying an imaginary part of the second complex number and an imaginary part of the fourth complex number, the first real part sum is obtained by adding the first real part product and the third real part product, and the second real part sum is obtained by adding the second real part product and the fourth real part product, and the real part result value is obtained by subtracting the second real part sum from the first real part sum.

The method may further comprise an imaginary part intermediate product calculation operation by which the SIMD processing apparatus calculates, in parallel, a first imaginary part product, a second imaginary part product, a third imaginary part product, and a fourth imaginary part product, based on the first complex number, the second complex number, the third complex number, and the fourth complex number, an imaginary part intermediate sum calculation operation by which the SIMD processing apparatus calculates a first imaginary part sum and a second imaginary part sum, based on the first imaginary part product, the second imaginary part product, the third imaginary part product, and the fourth imaginary part product, and an imaginary part result value calculation operation by which the SIMD processing apparatus calculates an imaginary part result value based on the first imaginary part sum and the second imaginary part sum, wherein the first imaginary part product is obtained by multiplying a real part of the first complex number and an imaginary part of the third complex number, the second imaginary part product is obtained by multiplying an imaginary part of the first complex number and a real part of the third complex number, the third imaginary part product is obtained by multiplying a real part of the second complex number and an imaginary part of the fourth complex number, and the fourth imaginary part product is obtained by multiplying an imaginary part of the second complex number and a real part of the fourth complex number, the first imaginary part sum is obtained by adding the first imaginary part product and the third imaginary part product, and the second imaginary part sum is obtained by adding the second imaginary part product and the fourth imaginary part product, and the imaginary part result value is obtained by adding the first imaginary part sum and the second imaginary part sum.

The SIMD processing apparatus may sequentially process the real part intermediate product calculation operation, the real part intermediate sum calculation operation, the real part result value calculation operation, the imaginary part intermediate product calculation operation, the imaginary part intermediate sum calculation operation, and the imaginary part result value calculation operation.

The SIMD processing apparatus may process, in parallel, the real part intermediate product calculation operation, and the imaginary part intermediate product calculation operation, the SIMD processing apparatus may process, in parallel, the real part intermediate sum calculation operation, and the imaginary part intermediate sum calculation operation, and the SIMD processing apparatus may process, in parallel, the real part result value calculation operation, and the imaginary part result value calculation operation.

The SIMD processing apparatus may process, in a fixed-point format, the real part and imaginary part of the first complex number, the real part and imaginary part of the second complex number, the real part and imaginary part of the third complex number, and the real part and imaginary part of the fourth complex number.

The SIMD processing apparatus may allocate n bits to each of the real part and imaginary part of the first complex number, the real part and imaginary part of the second complex number, the real part and imaginary part of the third complex number, and the real part and imaginary part of the fourth complex number, and may allocate 2n bits to each of the first real part product, the second real part product, the third real part product, the fourth real part product, the first real part sum, the second real part sum, and the result value.

In another aspect, there is provided a computer readable storage medium having stored therein program instructions to cause a processor to implement a method of operating a complex number, the method including a real part intermediate product calculation operation by which a Single Instruction Multiple Data (SIMD) processing apparatus calculates, in parallel, a first real part product, a second real part product, a third real part product, and a fourth real part product, based on a first complex number, a second complex number, a third complex number, and a fourth complex number, a real part intermediate sum calculation operation by which the SIMD processing apparatus calculates a first real part sum and a second real part sum, based on the first real part product, the second real part product, the third real part product, and the fourth real part product, and a real part result value calculation operation by which the SIMD processing apparatus calculates a real part result value based on the first real part sum and the second real part sum, wherein the first real part product is obtained by multiplying a real part of the first complex number and a real part of the third complex number, the second real part product is obtained by multiplying an imaginary part of the first complex number and an imaginary part of the third complex number, the third real part product is obtained by multiplying a real part of the second complex number and a real part of the fourth complex number, and the fourth real part product is obtained by multiplying an imaginary part of the second complex number and an imaginary part of the fourth complex number, the first real part sum is obtained by adding the first real part product and the third real part product, and the second real part sum is obtained by adding the second real part product and the fourth real part product, and the real part result value is obtained by subtracting the second real part sum from the first real part sum.

In another aspect, there is provided a processor that has a Single Instruction Multiple Data (SIMD) architecture for processing a complex number operation, the processor including a first complex number operator configured to receive as an input a plurality of complex numbers that each comprise a real part that has a maximum size of n bits and an imaginary part that has a maximum size of n bits, and to perform a first operation to generate a first product that has a maximum size of 2n bits using the plurality of complex numbers, and a storage comprising a plurality of registers that correspond to the plurality of complex numbers, each register configured to store n bits, and the plurality of registers are configured to store the plurality of complex numbers and to store the first product generated by the first complex number operator.

The first complex number generator may generate a plurality of first products that each have a maximum size of 2n bits, the first complex generator may perform a second operation to generate a sum of the plurality of first products, and the plurality of registers may be further configured to store the sum of the plurality of the first products.

The first complex number generator may generate a first sum of the first products and a second sum of the first products, the first complex generator may perform a third operation to generate a difference between the first sum of the first products and the second sum of the first products, and the plurality of registers may be further configured to store the difference between the first sum of the first products and the second sum of the first products.

Other features and aspects may be apparent from the following detailed description, the drawings, and the claims.

BRIEF DESCRIPTION OF THE DRAWINGS

FIG. 5 is a diagram illustrating an example of simultaneously performing an operation on values of taps of an FIR filter.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

The following description is related to a Single Instruction Multiple Data (SIMD) architecture that may be used to secure and process as much significant bits as needed, in an operator that may considerably increase a number of significant bits of an operation. The operator may include, for example, a complex number multiplier.

Figure 1:
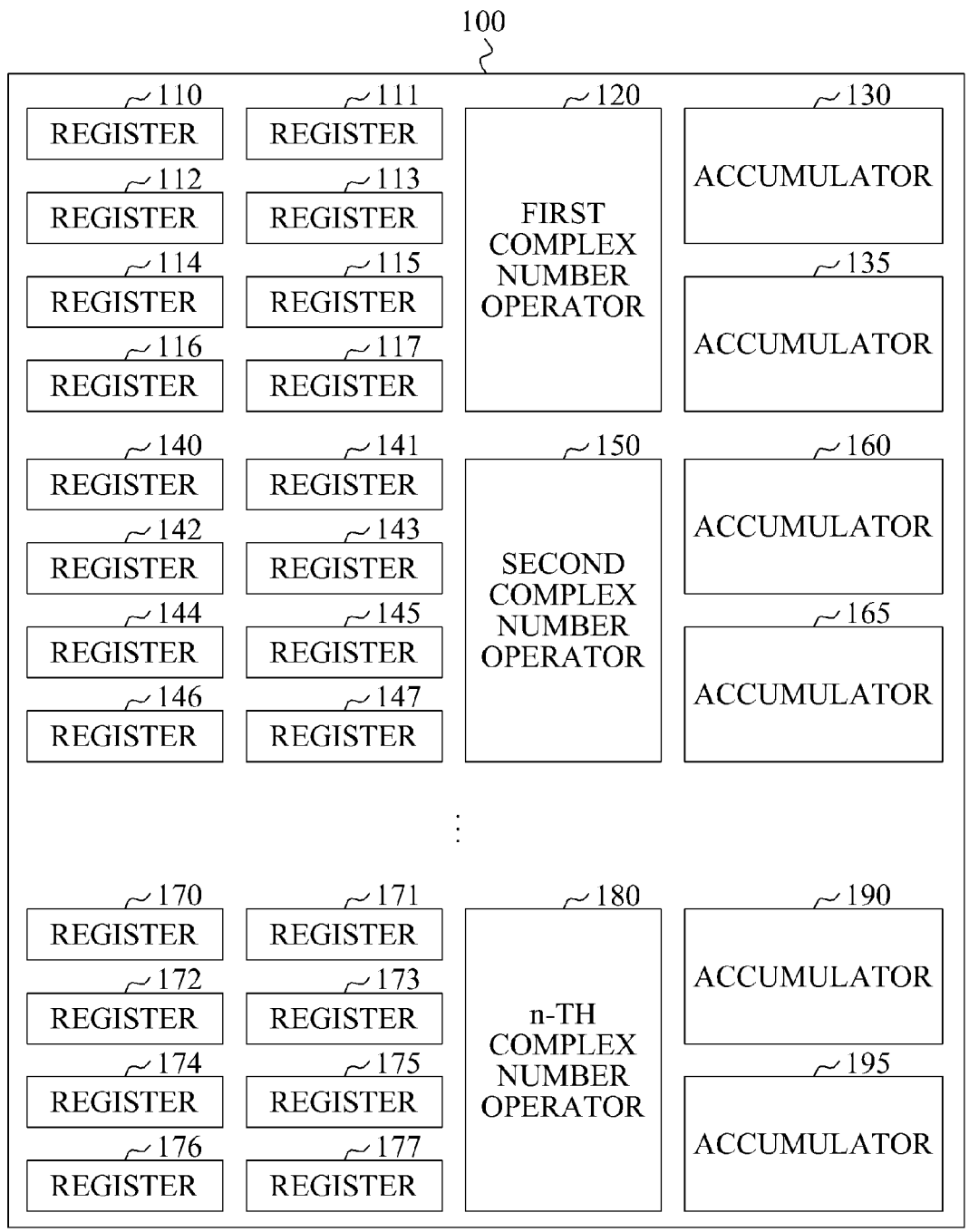
FIG. 1 is a diagram illustrating an example of a Single Instruction Multiple Data (SIMD) operation apparatus.

FIG. 1 illustrates an example of a SIMD operation apparatus. For example, the SIMD apparatus may be or may be included in a processor that is included in a terminal such as a computer, a mobile terminal, a smart phone, a laptop computer, a personal digital assistant, a tablet, an MP3 player, a home appliance, a television, and the like.

SIMD operation apparatus 100 of FIG. 1 may include at least one complex number operator. In the example of FIG. 1, the SIMD operation apparatus 100 includes a first complex number operator 120, a second complex number operator 150, and an n-th complex number operator 180. The first complex number operator 120 to the n-th complex number operator 180 may perform a 4-way operation.

In an example in which the SIMD operation apparatus 100 includes a 4-way SIMD architecture, the SIMD operation apparatus 100 may include a single complex number operator.

As another example, if the SIMD operation apparatus 100 includes an n-way SIMD architecture, the SIMD operation apparatus 100 may include n/4 complex number operators. For example, the n/4 complex number operators may be obtained by dividing the SIMD operation apparatus 100 in each 4-way unit, or may be a portion of the n-way SIMD operation apparatus 100. It should be appreciated that the SIMD operation apparatus 100 is not limited to a 4-way or k-way unit, where k is a multiple of 4.

The SIMD operation apparatus 100 may include at least one register. In the example of FIG. 1, the SIMD operation apparatus 100 includes registers 110 to 117, 140 to 147, and 170 to 177. The SIMD operation apparatus 100 may include at least one accumulator, for example accumulators 130, 135, 160, 165, 190, and 195. The accumulators 130, 135, 160, 165, 190, and 195 may be real part accumulators or imaginary part accumulators.

If an input value is represented by n bits, each of the registers 110 to 117, 140 to 147, and 170 to 177 may have a size of n bits, and each of the accumulators 130, 135, 160, 165, 190, and 195 may have a size of 2n bits.

Figure 2:
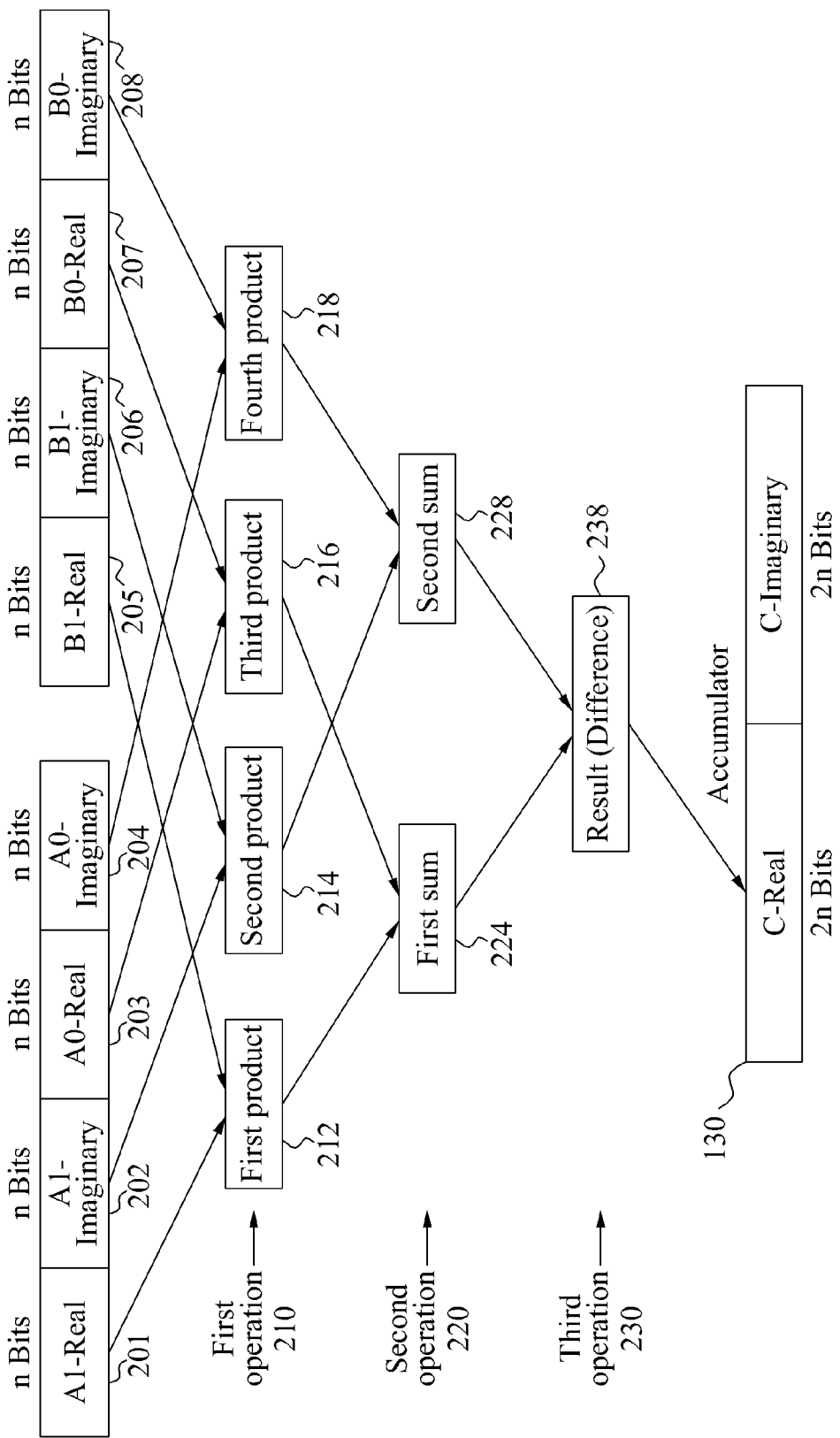
FIG. 2 is a diagram illustrating an example of a real part operation that is performed by a complex number operator.

FIG. 2 illustrates an example of a real part operation that is performed by a complex number operator.

The first complex number operator 120 shown in FIG. 1 may perform a real part operation with respect to a first complex number A1, a second complex number A0, a third complex number B1, and a fourth complex number B0 as shown in FIG. 2. Referring to FIG. 2, the real part operation may include, for example, a first operation 210, a second operation 220, and a third operation 230.

In the example of FIG. 2, each of the first complex number A1, the second complex number A0, the third complex number B1, and the fourth complex number B0 are divided into a real part and an imaginary part.

For example, the first complex number A1 includes a real part 201 and an imaginary part 202, and the second complex number A0 includes a real part 203 and an imaginary part 204. The third complex number B1 includes a real part 205 and an imaginary part 206, and the fourth complex number B0 includes a real part 207 and an imaginary part 208. The real parts 201, 203, 205 and 207, and imaginary parts 202, 204, 206 and 208 may be used as input values for the first operation 210, the second operation 220, and the third operation 230.

The first complex number operator 120 may sequentially perform the first operation 210, the second operation 220, and the third operation 230, to calculate a real part of a sum of a product of the first complex number A1 and third complex number B1 and a product of the second complex number A0 and fourth complex number B0.

As an example, the real parts 201, 203, 205 and 207, and the imaginary parts 202, 204, 206 and 208 may be stored in the registers 110 to 117, respectively. The real parts 201, 203, 205 and 207, and the imaginary parts 202, 204, 206 and 208 may include fixed-point values.

To efficiently process a Data Level Parallelism (DLP) in an algorithm, a Digital Signal Processing (DSP) processor may adopt a SIMD architecture, and may provide a fixed-point operation. In the fixed-point operation, limited bits of data may be used within a range where an overflow does not occur. To prevent the overflow, a shift operation, and the like may be used. If the shift operation is used, a quantization error may be inevitably accumulated in data expressed by fixed-points. Additionally, the shift operation may be repeatedly applied to data, even if the shift operation is not needed. Furthermore, if the fixed-point operation is extended to a complex number, the above-described problem may become worse.

Bits of data for representing fixed-point values may be variably allocated. However, to reduce the complexity of the SIMD operation apparatus 100, the total bit number of the real parts 201, 203, 205 and 207, and the imaginary parts 202, 204, 206 and 208 may be fixed. For example, real parts 201, 203, 205 and 207, and the imaginary parts 202, 204, 206 and 208 (namely, input values or registers to store input values) may include n bits. In this example, the SIMD operation apparatus 100 may allocate n bits to each of the real parts 201, 203, 205 and 207, and the imaginary parts 202, 204, 206 and 208.

Referring to the first operation 210, the first complex number operator 120 (shown in FIG. 1) may perform the first operation 210, and a first product 212, a second product 214, a third product 216, and a fourth product 218 are generated. In this example, the first product 212 is obtained by multiplying the real part 201 of the first complex number A1 and the real part 205 of the third complex number B1. The second product 214 is obtained by multiplying the imaginary part 202 of the first complex number A1 and the imaginary part 206 of the third complex number B1. The third product 216 is obtained by multiplying the real part 203 of the second complex number A0 and the real part 207 of the fourth complex number B0. The fourth product 218 is obtained by multiplying the imaginary part 204 of the second complex number A0 and the imaginary part 208 of the fourth complex number B0.

Each of the first product 212 to the fourth product 218 may include 2n bits. In this example, the SIMD operation apparatus 100 may allocate 2n bits to each of the first product 212 through the fourth product 218.

The real parts 201 and 205 of the first product 212 may each include n bits. Accordingly, a result value obtained by multiplying two input values, for example the real parts 201 and 205, may have 2n bits at a maximum.

For example, if a number of bits of the first product 212 is less than 2n, first product 212 may be shifted to the right by suitable bits, before the first product 212 is stored. Such a right shift operation may prevent an overflow of data.

An amount of data to be shifted by the right shift operation may be determined based on a range of input values to be operated. If a number of bits for storing the result value are limited, a quantization error may occur. To reduce the quantization error, the shift operation may be performed each time a result value is generated. However, if the shift operation is repeatedly performed, a quantization error caused by the shift operation may accumulate.

If a Finite Impulse Response (FIR) filter is used to obtain an operation result, for example the first product 212, using the same number of bits (for example, n) as the number of bits used by the real parts 201 and 205, quantization may be reduced, however, a performance may also be reduced due to a measurable quantization error. Accordingly, to obtain an operation result, such as the first product 212, a number of significant bits may be extended to 2n.

If the number of significant bits is extended, the operation result, for example the first product 212, may be stored without the shift operation. The SIMD operation apparatus 100 may secure a sufficient number of significant bits to the first product 212, thus, it is possible to cancel the shift operation, and to reduce the quantization error that may be caused by the shift operation.

A storage unit, for example the registers 110 and 111 shown in FIG. 1, may be used to store the real parts 201 and 205, and may also be used to store the first product 212. For example, the registers 110 and 111 may respectively store upper n bits and lower n bits of the first product 212. Accordingly, a separate memory or additional register to store the first product 212 is not needed. The above-description may also be applied to the second product 214 to the fourth product 218.

Referring to the second operation 220, the first complex number operator 120 may perform the second operation 220, and a first sum 224 and a second sum 228 may be generated. In this example, the first sum 224 is obtained by adding the first product 212 and the third product 216. The second sum 228 is obtained by adding the second product 214 and the fourth product 218.

Each of the first sum 224 and the second sum 228 may include 2n bits. In this example, the SIMD operation apparatus 100 may allocate 2n bits to each of the first sum 224 and the second sum 228.

A portion of or all of a storage unit, for example the registers 110 to 113, may be used to store the first product 212 and the second product 214, and may also be used to store the first sum 224. Accordingly, a separate memory or additional register is not needed to store the first sum 224. The above-description may also be applied to the second sum 228.

Referring to the third operation 230, first complex number operator 120 may perform the third operation 230, and a result value 238 may be generated. In this example, the result value 238 is obtained by subtracting the second sum 228 from the first sum 224. The result value 238 may include 2n bits. In this example, the SIMD operation apparatus 100 may allocate 2n bits to the result value 238.

The first complex number operator 120 may store the result value 238 in a real part accumulator, for example the accumulator 130. As another example, the first complex number operation 120 may add the result value 238 to a value of the real part accumulator. In the examples of the drawings, the real part accumulator is denoted by "C-Real", and the imaginary part accumulator is denoted by "C-Imaginary."

At least one of the first complex number operator 120, the second complex number operator 150, and the n-th complex number operator 180 of the SIMD operation apparatus 100 illustrated in FIG. 1 may perform the first operation 210, the second operation 220, and the third operation 230, illustrated in FIG. 2.

For example, the first operation 210, the second operation 220, and the third operation 230 may be sequentially performed, by executing a single instruction in the SIMD operation apparatus 100.

The SIMD operation apparatus 100 may perform pipelining. To apply a pipeline, different operators may be used to perform an input value load operation to load the real parts 201, 203, 205 and 207, and the imaginary parts 202, 204, 206 and 208 into registers, for example the registers 110 to 117. Different operators may be used to perform the first operation 210, the second operation 220, the third operation 230, and a result value storage operation for storing or accumulating the result value 238 in an accumulator, for example the accumulator 130. Additionally, a separate storage unit, for example a register and an accumulator, for each of the different operators may be used.

In the examples described herein, an operator configured to perform the input value load operation may be referred to as a "register load operator". An operator configured to perform the result value storage operation may be referred to as an "accumulator storage/accumulation operator". Further, an operator configured to perform the first operation 210, an operator configured to perform the second operation 220, and an operator configured to perform the third operation 230 may be referred to as a "first operator", a "second operator", and a "third operator", respectively.

For example, five instructions, such as a first instruction "instr1" to a fifth instruction "instr5" may be sequentially input.

In this example, the first instruction "instr1" may be transferred to the accumulator storage/accumulation operator, after sequentially passing through the register load operator, the first operator, the second operator, and the third operator. A second instruction "instr2" and a third instruction "instr3" may be transferred to the third operator and the second operator, respectively. A fourth instruction "instr4" and the fifth instruction "instr5" may be transferred to the first operator and the register load operator, respectively. In other words, the five operators may process different instructions. For example, while the register load operator processes the fifth instruction "instr5", the accumulator storage/accumulation operator may process the first instruction "instr1", and the like. Accordingly, five instructions may be simultaneously executed through the pipelining.

Each complex number operator may form a different pipeline. In this example, a greater number of instructions may be simultaneously executed. For example, the first complex number operator 120 simultaneously processes a first instruction through a fifth instruction through a pipeline of the first complex number operator 120, while the second complex number operator 150 may simultaneously process a sixth instruction through a tenth instruction through pipeline of the second complex number operator 150.

Figure 3:
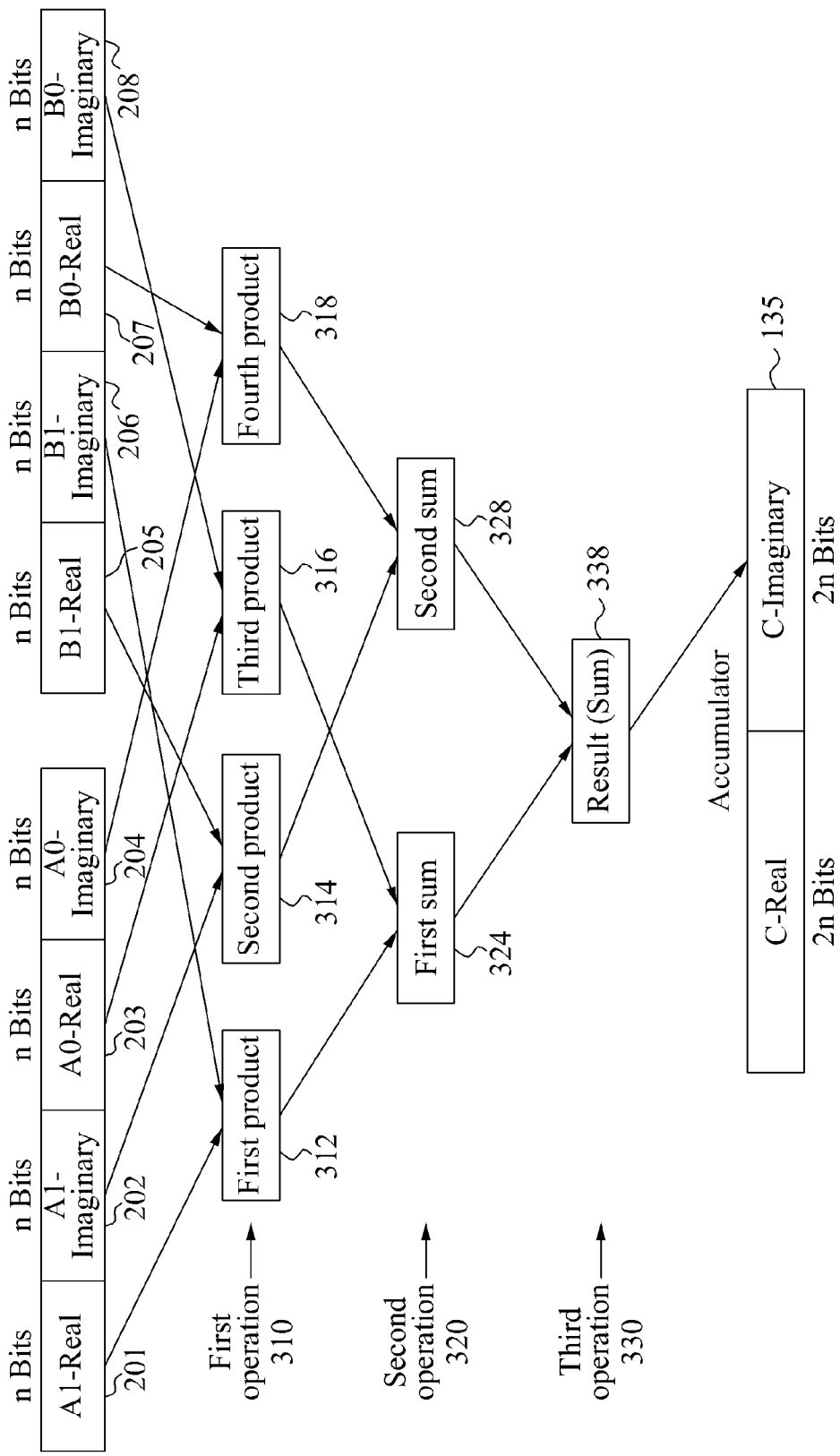
FIG. 3 is a diagram illustrating an example of an imaginary part operation that is performed by a complex number operator.

FIG. 3 illustrates an example of an imaginary part operation that is performed by a complex number operator.

The first complex number operator 120 shown in FIG. 1 may perform an imaginary part operation with respect to a first complex number A1, a second complex number A0, a third complex number B1, and a fourth complex number B0. The imaginary part operation may include, for example, a first operation 310, a second operation 320, and a third operation 330.

Referring to FIG. 3, the first complex number A1, the second complex number A0, the third complex number B1, and the fourth complex number B0, are divided into a real part and an imaginary part.

Input values used for the imaginary part operation may be equal to the input values used for the real part operation that are described herein with reference to FIG. 2. For example, the real part 201 and the imaginary part 202 of the first complex number A1, the real part 203 and the imaginary part 204 of the second complex number A0, the real part 205 and the imaginary part 206 of the third complex number B1, and the real part 207 and the imaginary part 208 of the fourth complex number B0 may be used as input values for the first operation 310, the second operation 320, and the third operation 330.

The first complex number operator 120 may sequentially perform the first operation 310, the second operation 320, and the third operation 330, to calculate an imaginary part of a sum of a product of the first complex number A1 and third complex number B1, and a product of the second complex number A0 and fourth complex number B0.

For example, the real parts 201, 203, 205 and 207, and the imaginary parts 202, 204, 206 and 208 may be stored in the registers 110 to 117, respectively. Each of the real parts 201, 203, 205 and 207, and the imaginary parts 202, 204, 206 and 208 may include fixed-point values.

Bits of data for representing fixed-point values may be variably allocated. However, to reduce the complexity of the SIMD operation apparatus 100, the total bit number of the real parts 201, 203, 205 and 207, and the imaginary parts 202, 204, 206 and 208 may be fixed. For example, the real parts 201, 203, 205 and 207, and the imaginary parts 202, 204, 206 and 208 (namely, registers to store input values) may include n bits.

Referring to the first operation 310, the first complex number operator 120 (shown in FIG. 1) may perform the first operation 310, and a first product 312, a second product 314, a third product 316, and a fourth product 318 may be generated. In this example, the first product 312 is obtained by multiplying the real part 201 of the first complex number A1 and the imaginary part 206 of the third complex number B1. The second product 314 is obtained by multiplying the imaginary part 202 of the first complex number A1 and the real part 205 of the third complex number B1. The third product 316 is obtained by multiplying the real part 203 of the second complex number A0 and the imaginary part 208 of the fourth complex number B0. The fourth product 318 is obtained by multiplying the imaginary part 204 of the second complex number A0 and the real part 207 of the fourth complex number B0.

Each of the first product 312 through the fourth product 318 may include 2n bits. In this example, the SIMD operation apparatus 100 may allocate 2n bits to each of the first product 312 through the fourth product 318.

A storage unit, for example the registers 110 and 111 shown in FIG. 1, may be used to store the real part 201 and imaginary part 206, and may also be used to store the first product 312. For example, the registers 110 and 111 may respectively store upper n bits and lower n bits of the first product 312. Accordingly, a separate memory or additional register to store the first product 312 is not needed. The above-description may also be applied to the second product 314 to the fourth product 318.

Referring to the second operation 320, the first complex number operator 120 may perform the second operation 320, and a first sum 324 and a second sum 328 may be generated. In this example, the first sum 324 is obtained by adding the first product 312 and the third product 316. The second sum 328 is obtained by adding the second product 314 and the fourth product 318.

Each of the first sum 324 and the second sum 328 may include 2n bits. In this example, the SIMD operation apparatus 100 may allocate 2n bits to each of the first sum 324 and the second sum 328.

A portion of or all of a storage unit, for example the registers 110 to 113 shown in FIG. 1, may be used to store the first product 312 and the second product 314, and may also be used to store the first sum 324. Accordingly, a separate memory or additional register may not be used or needed to store the first sum 324. The above-description may also be applied to the second sum 328.

Referring to the third operation 330, the first complex number operator 120 may perform the third operation 330, and a result value 338 may be generated. In this example, the result value 338 is obtained by adding the first sum 324 and the second sum 328.

The result value 338 may include 2n bits. In this example, the SIMD operation apparatus 100 may allocate 2n bits to the result value 338.

The first complex number operator 120 may store the result value 338 in an imaginary part accumulator, for example the accumulator 135. As another example, the first complex number operator 120 may add the result value 338 to a value of the imaginary part accumulator.

At least one of the first complex number operator 120, the second complex number operator 150, and the n-th complex number operator 180 in the SIMD operation apparatus 100 may perform the first operation 310, the second operation 320, and the third operation 330, as described herein.

The first operation 310, the second operation 320, and the third operation 330 may be sequentially performed by executing a single instruction in the SIMD operation apparatus 100.

As described herein, each of the first complex number operator 120, the second complex number operator 150, and the n-th complex number operator 180 may perform the real part operation and the imaginary part operation.

Accordingly, each of the first complex number operator 120, the second complex number operator 150, and the n-th complex number operator 180 may perform a first operation, a second operation, and a third operation, with respect to a first complex number, a second complex number, a third complex number, and a fourth complex number. In this example, the first operation may be either the first operation 210 or the first operation 310, the second operation may be either the second operation 220 or the second operation 320, and the third operation may be either the third operation 230 or the third operation 330.

The first operation 210 or first operation 310 may be performed to calculate, in parallel, a first product, a second product, a third product, and a fourth product, by multiplying two numbers at a time from among eight numbers. In this example, the eight numbers may represent a real part and an imaginary part of the first complex number, a real part and an imaginary part of the second complex number, a real part and an imaginary part of the third complex number, and a real part and an imaginary part of the fourth complex number, respectively.

The second operation may be performed to calculate, in parallel, a first sum of the first product and the third product, and a second sum of the second product and the fourth product. The second operation 220 and the second operation 320 may be performed in a similar manner.

The third operation may be performed to generate, as a resultant value, a value obtained by adding the first sum and the second sum, or a value obtained by subtracting the second sum from the first sum.

The SIMD operation apparatus 100 may perform pipelining. To apply a pipeline, different operators may be used to perform an input value load operation of loading the real parts 201, 203, 205 and 207, and the imaginary parts 202, 204, 206 and 208 into registers, for example the registers 110 to 117 shown in FIG. 1. Different operators may be used to perform the first operation 310, the second operation 320, the third operation 330, and a result value storage operation of storing or accumulating the result value 338 in an accumulator, for example the accumulator 135. Additionally, a separate storage unit for each of the different operators is not needed.

Hereinafter, an operator configured to perform the first operation 310, an operator configured to perform the second operation 320, and an operator configured to perform the third operation 330 may be referred to as a "first operator", a "second operator", and a "third operator", respectively. The pipelining examples described with reference to FIG. 2, may also be applied to the example of FIG. 3. For example, five instructions such as a first instruction "instr1" through a fifth instruction "instr5" may be sequentially input and processed in parallel.

Figure 4:
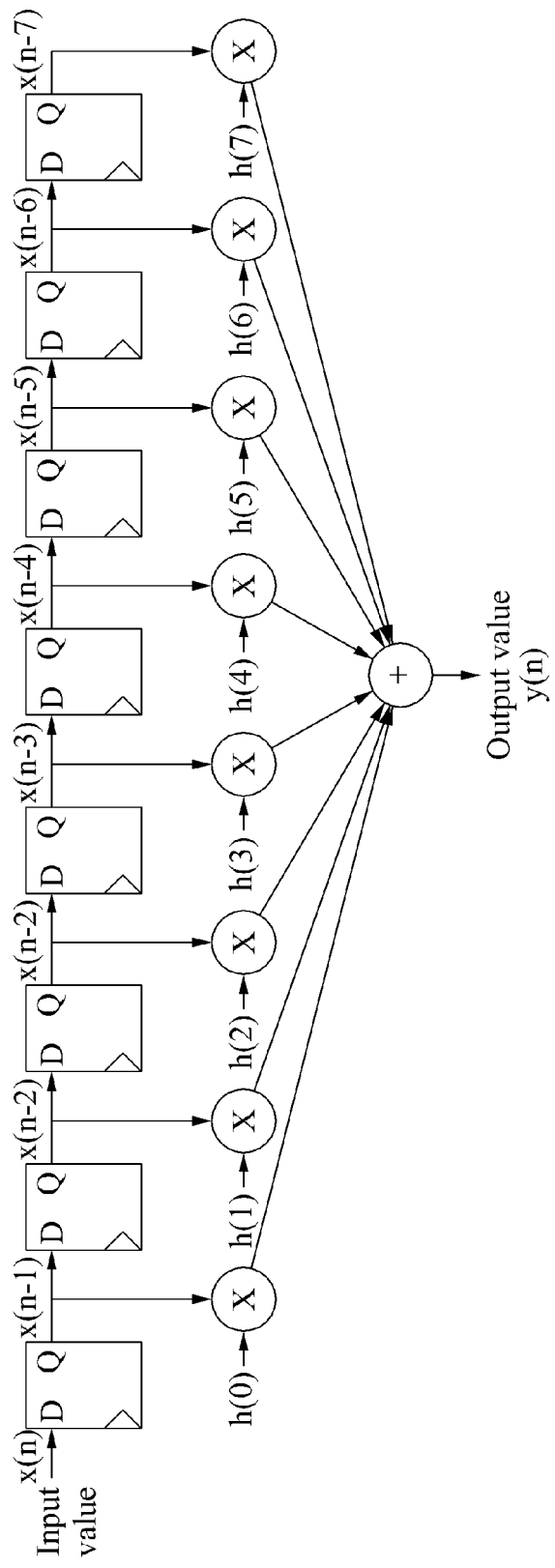
FIG. 4 is a diagram illustrating an example of a Finite Impulse Response (FIR) filter.

FIG. 4 illustrates an example of an FIR filter.

Referring to FIG. 4, an example using each of the first complex number operator 120, the second complex number operator 150, and the n-th complex number operator 180 in an FIR filter 400 is described.

An analog-digital (A/D) conversion may be performed on a communication signal that is received via an antenna to generate a digital communication signal. For example, before the digital communication signal is transformed into a real number by a Quadrature Amplitude Modulation (QAM) demapper decoder, most of the digital communication signal may be processed in the form of a complex number by a modem, except for a channel decoder block.

Generally, a complex number is expressed in the form of "a+bj" in which "a" indicates a real part and "b" indicates an imaginary part. A communication algorithm may use the four arithmetical operations using complex numbers.

For example, if a processor that is optimized for processing real numbers is used for an algorithm that performs a complex calculation that is used by a communication modem, and is used for an operation of a Multiple-Input Single-Output (MISO)/Multiple-Input Multiple-Output (MIMO) detector for a high-performance receiver, an operation efficiency may be reduced up to 4 times. The algorithm may include, for example, a Fast Fourier Transform (FFT)/Inverse FFT (IFFT), an FIR filter, a channel estimator, and an equalizer.

The SIMD operation apparatus 100 may perform a function of the FIR filter 400.

As illustrated in FIG. 4, the FIR filter 400 may perform a series of multiplications, and may add values that are obtained by the multiplications. In this example, the FIR filter 400 may generate a complex inner product.

A basic formula of the FIR filter 400 used in communication may be expressed as given in the following Equation 1:

$$y(n) = \sum_{i=0}^{N-1} h(i)x(n-i) =$$
$$h(0)x(n) + h(1)x(n-1) + \ldots + h(N-1)x(n-N+1)$$ [Equation 1]

In Equation 1, x(n) denotes an input value and y(n) denotes an output value. Additionally, h(i) denotes a coefficient value of the FIR filter 400.

In a communication system, an input value, an output value, and a coefficient value may generally be complex numbers.

A product of complex numbers may be calculated as given in the following Equation 2:

$$(R_0+I_0 j)(R_1+I_1 j)=(R_0 R_1-I_0 I_0)+(R_0 I_1+I_0 R_1)j$$ [Equation 2]

Real parts of a result value of a complex number obtained by multiplying an input signal and a coefficient value may be added, and imaginary parts of the result value may be added using Equation 2, and a final result value of the FIR filter 400 may be acquired.

For example, real parts may be calculated using the first operation 210 through the third operation 230 that are described above with reference to FIG. 2, and the calculated real parts may be accumulated in a real part accumulator. Additionally, imaginary parts may be calculated using the first operation 310 through the third operation 330 that are described above with reference to FIG. 3, and the calculated imaginary parts may be accumulated in an imaginary part accumulator.

FIG. 5 illustrates an example of simultaneously performing an operation on values of taps of an FIR filter.

Referring to FIG. 5, a value of a 2-tap 510 may be calculated at once using the first operation 210 through the third operation 230, and the first operation 310 through the third operation 330.

In an example in which the SIMD operation apparatus 100 has a 4-way SIMD architecture, a real part of the 2-tap 510 may be calculated simultaneously, and then an imaginary part of the 2-tap 510 may be calculated simultaneously. In this example, the complex numbers A1, A0, B1, and B0 may correspond to h(0), h(n), x(0), and x(n−1), respectively, as illustrated in FIG. 5.

In another example in which the SIMD operation apparatus 100 has an 8-way SIMD architecture, the SIMD operation apparatus 100 may include two complex number operators. For example, if one complex number operator performs the first operation 210 to the third operation 230, and another complex number operator performs the first operation 310 to the third operation 330, the real part and the imaginary part of the 2-tap 510 may be calculated simultaneously.

The calculated real part may be accumulated in a real part accumulator, and the calculated imaginary part may be accumulated in an imaginary part accumulator.

In response to the 2-tap 510 being calculated, the SIMD operation apparatus 100 may calculate a 2-tap 520, and may accumulate a result of the calculation in accumulators.

A real part and imaginary part of the entire expression may be calculated by accumulating result values.

As another example, the at least one complex number in the SIMD operation apparatus 100 may perform real part operations of different 2-taps, and may then perform imaginary part operations of the different 2-taps.

Accordingly, if the SIMD operation apparatus 100 has an N-way architecture, the SIMD operation apparatus 100 may perform the real part operation or the imaginary part operation of N/2 taps at the same time, and may accumulate a real part or an imaginary part generated by the real part operation or the imaginary part operation, at the same time, without a quantization error.

Figure 6:
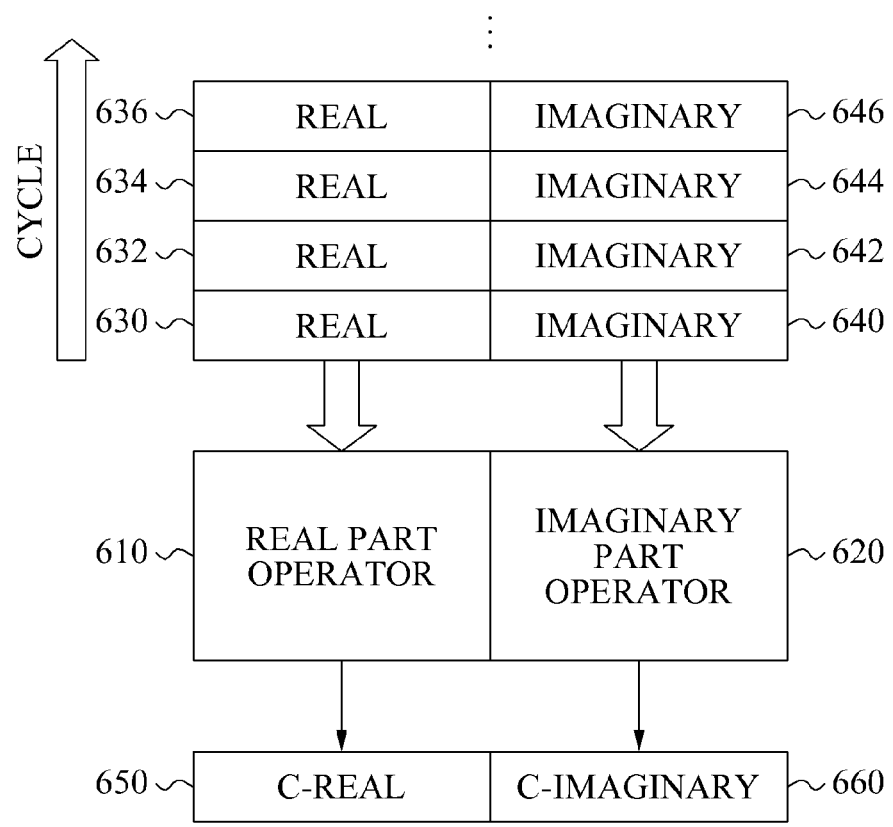
FIG. 6 is a diagram illustrating an example of a first implementation of an SIMD process.

FIG. 6 illustrates an example a first implementation of an SIMD process.

Each of the first complex number operator 120, the second complex number operator 150, and the n-th complex number operator 180 of the SIMD operation apparatus 100 may be used as either a real part operator 610 or an imaginary part operator 620. The real part operator 610 may include at least one complex number operator to perform the real part operation as described herein with reference to FIG. 2. The imaginary part operator 620 may include at least one complex number operator to perform the imaginary part operation described herein with reference to FIG. 3.

In this example, each of the first complex number operator 120, the second complex number operator 150, and the n-th complex number operator 180 may be specified to perform either the real part operation or the imaginary part operation. Accordingly, the real part operation and imaginary part operation for predetermined input values may be processed in parallel.

As described herein, values that are generated during the real part operation (for example, the first product 212 shown in FIG. 2) may be stored in a storage unit in which an input value is already stored. Accordingly, input values may be separately provided to the real part operator 610 and the imaginary part operator 620.

Additionally, different input values may be separately provided to the real part operator 610 and the imaginary part operator 620.

Referring to FIG. 6, input values 630, 632, 634, and 636 that are used for the real part operation may be sequentially provided to the real part operator 610, based on an operation cycle. For example, the input values 630, 632, 634, and 636 may be loaded into a register that is used by the real part operator 610 to perform the real part operation.

Additionally, input values 640, 642, 644, and 646 that are used for the imaginary part operation may be sequentially provided to the imaginary part operator 620, based on the operation cycle. For example, the input values 640, 642, 644, and 646 may be loaded into a register that is used by the imaginary part operator 620 to perform the imaginary part operation.

The result value 238 shown in FIG. 2 that may be generated by the real part operator 610 may be stored or accumulated in a real part accumulator 650. The result value 338 shown in FIG. 3 that may be generated by the imaginary part operator 620 may be stored or accumulated in an imaginary part accumulator 660.

As described herein, the SIMD operation apparatus 100 may unify the real part operator 610, the imaginary part operator 620, the real part accumulator 650, and the imaginary part accumulator 660 that are used to perform a complex inner product operation, and may reflect a result of the unified architecture of the SIMD operation apparatus 100. Thus, it is possible to accelerate software processing of a kernel, such as an FIR filter.

Figure 7:
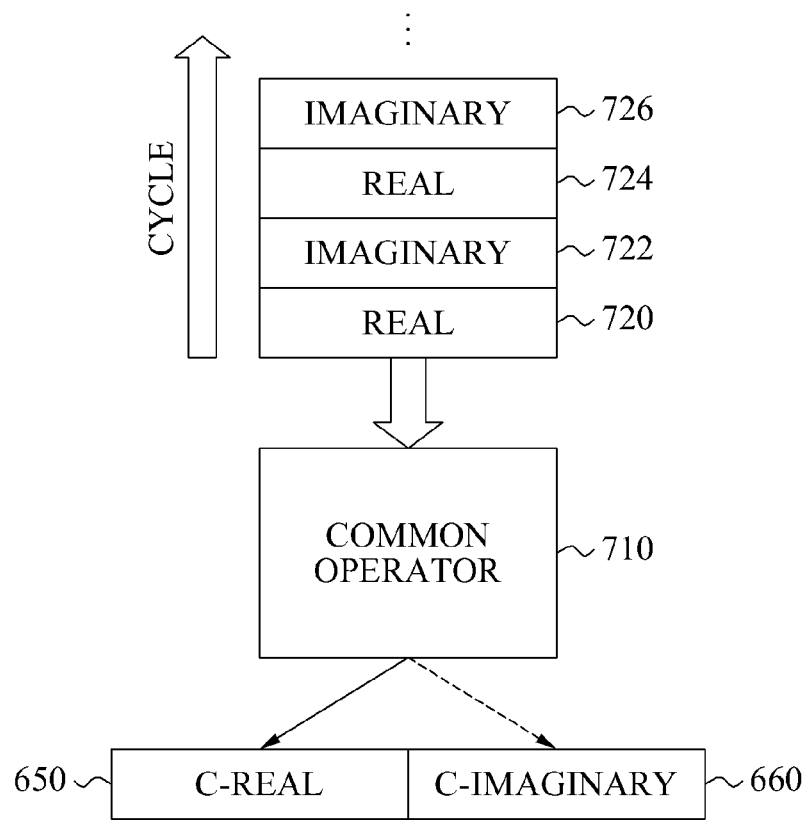
FIG. 7 is a diagram illustrating an example of a second implementation of an SIMD process.

FIG. 7 illustrates an example of a second implementation of an SIMD process.

Each of the first complex number operator 120, the second complex number operator 150, and the n-th complex number operator 180 in the SIMD operation apparatus 100 may be used as a common operator 710.

The common operator 710 may alternately perform a real part operation and an imaginary part operation that are described above with reference to FIGS. 2 and 3. In this example, the first complex number operator 120, the second complex number operator 150, and the n-th complex number operator 180 may each process both the real part operation and imaginary part operation.

The real part operation and imaginary part operation may be performed substantially in the same manner, except for a difference in selecting the real parts 201, 203, 205 and 207, and the imaginary parts 202, 204, 206 and 208 that are used to calculate the first product 212 through the fourth product 218 and the first product 312 through the fourth product 318, and in generating the result values 238 and 338. For example, to select the real parts 201, 203, 205 and 207, and the imaginary parts 202, 204, 206 and 208, a multiplexer may be used.

Accordingly, the real part operation and the imaginary part operation may be sequentially processed through pipelining.

The common operator 710 may receive input values 720, 722, 724, and 726 in sequence, based on an operation cycle. In this example, the input values 720, 722, 724, and 726 may be used to alternately perform the real part operation and imaginary part operation.

For example, in a predetermined cycle, the common operator 710 may perform the real part operation using the input values 720 and 724 for the real part operation, and may store or accumulate the generated result value 238 in the real part accumulator 650. In a next cycle, the common operator 710 may perform the imaginary part operation using the input values 722 and 726 for the imaginary part operation, and may store or accumulate the generated result value 338 in the imaginary part accumulator 660.

In the second implementation method of FIG. 7, function units may be used by half of the function units used in the first implementation method of FIG. 6, however, a number of cycles may be twice that of the first implementation method of FIG. 6.

The first implementation method and the second implementation method may have various advantages and disadvantages, respectively. Accordingly, either the first implementation method or the second implementation method may be selected, for example, based on an implementation purpose of the SIMD operation apparatus 100. As another example, a scheme of combining the first implementation method and the second implementation method may be used.

Figure 8:
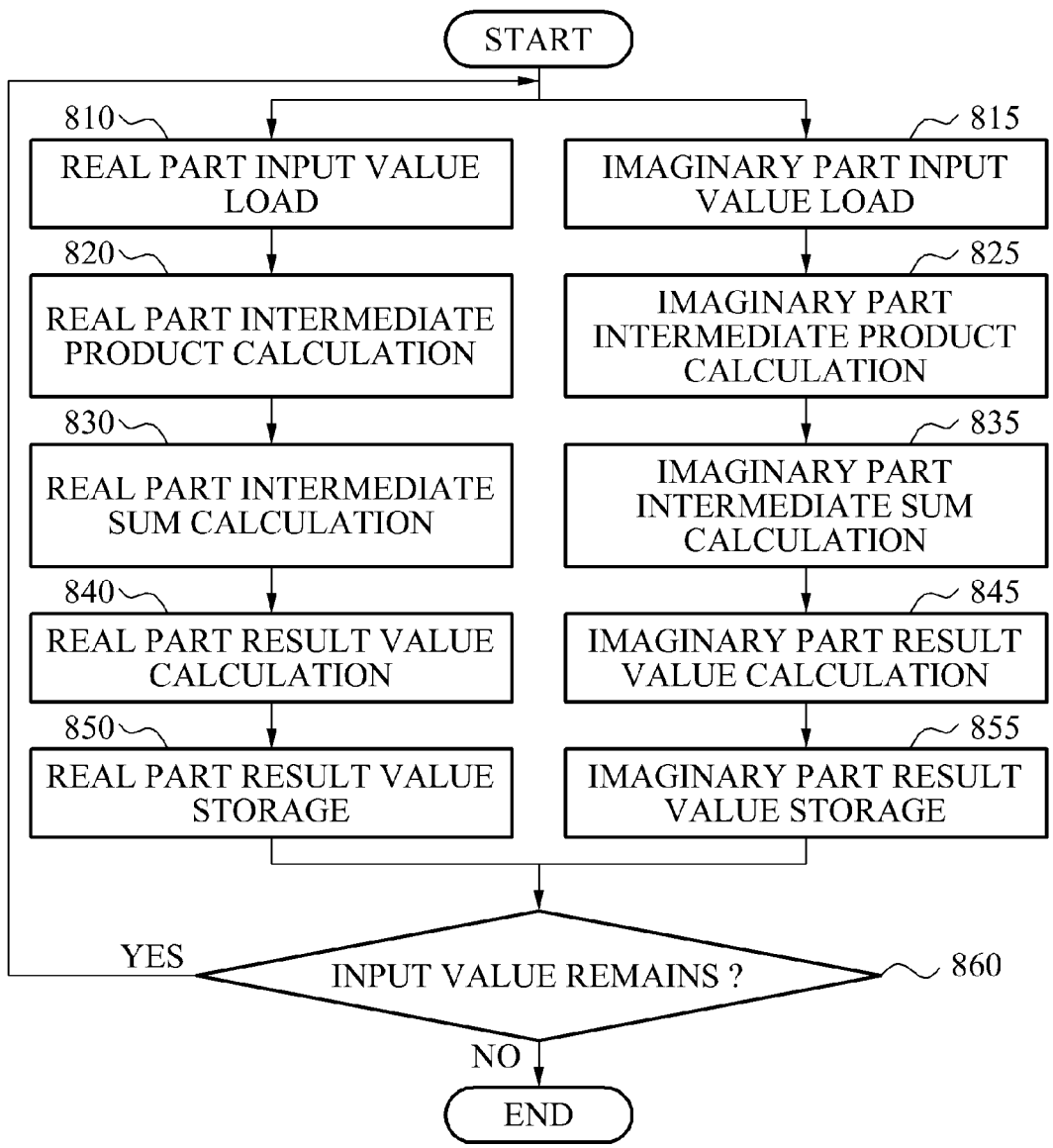
FIG. 8 is a flowchart illustrating an example of a complex number operation method.

FIG. 8 illustrates an example of a complex number operation method.

Referring to FIGS. 2, 6, and 8, in real part input value load operation 810, the SIMD operation apparatus 100 may load input values that are used for the real part operation (for example, the first complex number A1, the second complex number A0, the third complex number B1, and the fourth complex number B0) in a storage unit of the real part operator 610, or in a register that is accessible by the real part operator 610.

In imaginary part input value load operation 815, the SIMD operation apparatus 100 may load input values that are used for the imaginary part operation (for example, the first complex number A1, the second complex number A0, the third complex number B1, and the fourth complex number B0) in a storage unit of the imaginary part operator 620, or in a register that is accessible by the imaginary part operator 620.

For example, the real part input value load operation 810 and imaginary part input value load operation 815 may be performed in parallel by the SIMD operation apparatus 100.

In real part intermediate product calculation operation 820, the real part operator 610 may perform the first operation 210. For example, the real part operator 610 may calculate the first product 212, the second product 214, the third product 216, and the fourth product 218. In imaginary part intermediate product calculation operation 825, the imaginary part operator 620 may perform the first operation 310. For example, the imaginary part operator 620 may calculate the first product 312, the second product 314, the third product 316, and the fourth product 318.

For example, the real part intermediate product calculation operation 820 and imaginary part intermediate product calculation operation 825 may be performed in parallel by the SIMD operation apparatus 100.

In real part intermediate sum calculation operation 830, the real part operator 610 may perform the second operation 220. For example, the real part operator 610 may calculate the first sum 224, and the second sum 228. In imaginary part intermediate sum calculation operation 835, the imaginary part operator 620 may perform the second operation 320. For example, the imaginary part operator 620 may calculate the first sum 324, and the second sum 328.

For example, the part intermediate sum calculation operation 830 and imaginary part intermediate sum calculation operation 835 may be performed in parallel by the SIMD operation apparatus 100.

In real part result value calculation operation 840, the real part operator 610 may perform the third operation 230. For example, the real part operator 610 may calculate the result value 238. In imaginary part result value calculation operation 845, the imaginary part operator 620 may perform the third operation 330. For example, the imaginary part operator 620 may calculate the result value 338.

For example, the real part result value calculation operation 840 and imaginary part result value calculation operation 845 may be performed in parallel by the SIMD operation apparatus 100.

In real part result value storage operation 850, the real part operator 610 may store or accumulate the calculated result value 238 in the real part accumulator 650. In imaginary part result value storage operation 855, the imaginary part operator 620 may store or accumulate the calculated result value 338 in the imaginary part accumulator 660.

For example, the part result value storage operation 850 and imaginary part result value storage operation 855 may be performed in parallel by the SIMD operation apparatus 100.

In operation 860, the SIMD operation apparatus 100 may determine whether there remains an input value to be processed. If it is determined that the input value remains, real part input value load operation 810 to imaginary part result value storage operation 855 may be repeated. Conversely, if it is determined that there is no input value, the complex number operation method of FIG. 8 may be terminated.

Figure 9:
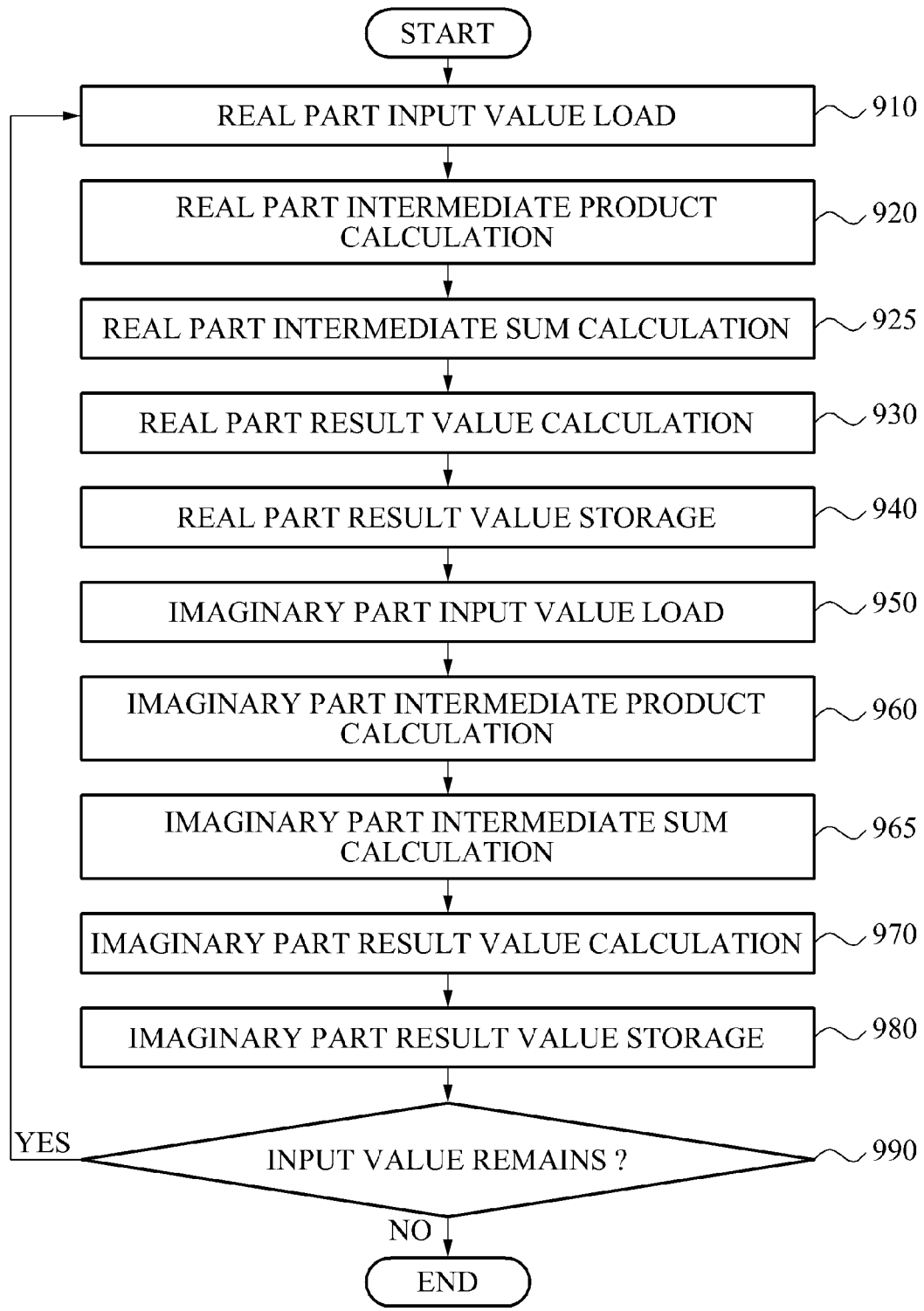
FIG. 9 is a flowchart illustrating another example of a complex number operation method Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 9 illustrates another example of a complex number operation method.

Referring to FIGS. 2, 7, and 9, in real part input value load operation 910, the SIMD operation apparatus 100 may load input values that are used for the real part operation (for example, the first complex number A1, the second complex number A0, the third complex number B1, and the fourth complex number B0) in a storage unit of the common operator 710 or in a register accessible by the common operator 710.

In real part intermediate product calculation operation 920, the common operator 710 may perform the first operation 210. For example, the common operator 710 may calculate the first product 212, the second product 214, the third product 216, and the fourth product 218.

In real part intermediate sum calculation operation 925, the common operator 710 may perform the second operation 220. For example, the common operator 710 may calculate the first sum 224 and the second sum 228.

In real part result value calculation operation 930, the common operator 710 may perform the third operation 230. For example, the common operator 710 may calculate the result value 238.

In real part result value storage operation 940, the common operator 710 may store or accumulate the calculated result value 238 in the real part accumulator 650.

In imaginary part input value load operation 950, the SIMD operation apparatus 100 may load input values that are used for the imaginary part operation (for example, the first complex number A1, the second complex number A0, the third complex number B1, and the fourth complex number B0) in a storage unit of the common operator 710, or in a register accessible by the common operator 710.

In imaginary part intermediate product calculation operation 960, the common operator 710 may perform the first operation 310. For example, the common operator 710 may calculate the first product 312, the second product 314, the third product 316, and the fourth product 318.

In imaginary part intermediate sum calculation operation 965, the common operator 710 may perform the second operation 320. For example, the common operator 710 may calculate the first sum 324 and the second sum 328.

In imaginary part result value calculation operation 970, the common operator 710 may perform the third operation 330. For example, the common operator 710 may calculate the result value 338.

In imaginary part result value storage operation 980, the common operator 710 may store or accumulate the calculated result value 338 in the imaginary part accumulator 660.

In operation 990, the SIMD operation apparatus 100 may determine whether there remains an input value to be processed. If it is determined that the input value remains, real part input value load operation 910 to imaginary part result value storage operation 980 may be repeated. Conversely, if it is determined that there is no input value, the complex number operation method of FIG. 9 may be terminated.

A method of calculating a complex inner product that has been described with reference to FIGS. 8 and 9 may be performed by batch instruction. Batch instruction may improve convenience of programming and a processing speed of a processor for receiving broadcast and communication signals.

The examples described herein with reference to FIGS. 1 to 7 may be applied to the examples described with reference to FIGS. 8 and 9, and further description thereof is omitted here for conciseness.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Single Instruction Multiple Data (SIMD) operation apparatus, comprising:
at least one complex number operating hardware processor configured to perform, with respect to received input data, a first operation, a second operation, and a third operation based on a first complex number, a second complex number, a third complex number, and a fourth complex number, wherein the first operation is performed to calculate, in parallel, a first product, a second product, a third product, and a fourth product, by multiplying two numbers at a time from among eight numbers, and the eight numbers respectively represent a real part and an imaginary part of the first complex number, a real part and an imaginary part of the second complex number, a real part and an imaginary part of the third complex number, and a real part and an imaginary part of the fourth complex number, wherein the second operation is performed to calculate, in parallel, a first sum of the first product and the third product, and a second sum of the second product and the fourth product, wherein the third operation is performed to generate, as a result value, either a value obtained by adding the first sum and the second sum, or a value obtained by subtracting the second sum from the first sum, and wherein at least one of the first product, the second product, the third product, and the fourth product is stored in a register in which at least one of the first complex number, the second complex number, the third complex number and the fourth complex number is stored.

2. The SIMD operation apparatus of claim 1, wherein the SIMD operation apparatus performs a function of a Finite Impulse Response (FIR) filter.

3. The SIMD operation apparatus of claim 2, wherein one of the at least one complex number operating hardware processor simultaneously performs an operation on values of two taps of the FIR filter.

4. The SIMD operation apparatus of claim 1, wherein the first operation, the second operation, and the third operation are sequentially performed by executing a single instruction in the SIMD operation apparatus.

5. The SIMD operation apparatus of claim 1, wherein the real part and imaginary part of the first complex number, the real part and imaginary part of the second complex number, the real part and imaginary part of the third complex number, and the real part and imaginary part of the fourth complex number each include n bits, and wherein the first product, the second product, the third product, the fourth product, the first sum, the second sum, and the result value each include 2n bits.

6. The SIMD operation apparatus of claim 1, wherein the at least one complex number operating hardware processor sequentially performs the first operation, the second operation, and the third operation, to calculate a real part of a value obtained by adding a product of the first complex number and the third complex number, and a product of the second complex number and the fourth complex number, wherein the first operation is performed to calculate, in parallel, a first product of the real part of the first complex number and the real part of the third complex number, a second product of the imaginary part of the first complex number and the imaginary part of the third complex number, a third product of the real part of the second complex number and the real part of the fourth complex number, and a fourth product of the imaginary part of the second complex number and the imaginary part of the fourth complex number, and wherein the third operation is performed to generate a result value that is obtained by subtracting the second sum from the first sum.

7. The SIMD operation apparatus of claim 1, wherein the at least one complex number operating hardware processor sequentially performs the first operation, the second operation, and the third operation, to calculate an imaginary part of a value obtained by adding a product of the first complex number and the third complex number, and a product of the second complex number and the fourth complex number, wherein the first operation is performed to calculate, in parallel, a first product of the real part of the first complex number and the imaginary part of the third complex number, a second product of the imaginary part of the first complex number and the real part of the third complex number, a third product of the real part of the second complex number and the imaginary part of the fourth complex number, and a fourth product of the imaginary part of the second complex number and the real part of the fourth complex number, and wherein the third operation is performed to generate a result value that is obtained by adding the second sum and the first sum.

8. The SIMD operation apparatus of claim 1, wherein a first complex number hardware operating processor of the at least one complex number operating hardware processor calculates a real part of a value obtained by adding a product of the first complex number and the third complex number to a product of the second complex number and the fourth complex number, and a second complex number operating hardware processor of the at least one complex number operating hardware processors calculates an imaginary part of the value obtained by adding the product of the first complex number and the third complex number to the product of the second complex number and the fourth complex number, and wherein a first operation of the first complex number operating hardware processor and a first operation of the second complex number operating hardware processor are performed in parallel, a second operation of the first complex number operating hardware processor and a second operation of the second complex number operating hardware processor are performed in parallel, and a third operation of the first complex number operating hardware processor, and a third operation of the second complex number operating hardware processor are performed in parallel.

9. The SIMD operation apparatus of claim 8, further comprising at least one accumulator, wherein the at least one accumulator is used as either a real part accumulator or an imaginary part accumulator, and wherein a first real part accumulator stores a result value of the first complex number operating hardware processor, and a first imaginary part accumulator stores a result value of the second complex number operating hardware processor.

10. The SIMD operation apparatus of claim 1, wherein the at least one complex number operating hardware processor sequentially calculates, as a first result value, a real part of a value that is obtained by adding a product of the first complex number and the third complex number to a product of the second complex number and the fourth complex number, and calculates, as a second result value, an imaginary part of the value that is obtained by adding the product of the first complex number and the third complex number to the product of the second complex number and the fourth complex number.

11. A method of operating a complex number, the method comprising:

a real part intermediate product calculation operation by which a Single Instruction Multiple Data (SIMD) hardware processor calculates, with respect to received input data, in parallel, a first real part product, a second real part product, a third real part product, and a fourth real part product, based on a first complex number, a second complex number, a third complex number, and a fourth complex number;

a real part intermediate sum calculation operation by which the SIMD hardware processor calculates a first real part sum and a second real part sum, based on the first real part product, the second real part product, the third real part product, and the fourth real part product; and a real part result value calculation operation by which the SIMD hardware processor calculates a real part result value based on the first real part sum and the second real part sum, wherein the first real part product is obtained by multiplying a real part of the first complex number and a real part of the third complex number, the second real part product is obtained by multiplying an imaginary part of the first complex number and an imaginary part of the third complex number, the third real part product is obtained by multiplying a real part of the second complex number and a real part of the fourth complex number, and the fourth real part product is obtained by multiplying an imaginary part of the second complex number and an imaginary part of the fourth complex number, wherein the first real part sum is obtained by adding the first real part product and the third real part product, and the second real part sum is obtained by adding the second real part product and the fourth real part product, wherein the real part result value is obtained by subtracting the second real part sum from the first real part sum, and wherein at least one of the first real part product, the second real part product, the third real part product and the fourth real part product is stored in a register in which one of the first complex number, the second complex number, the third complex number and the fourth complex number is stored.

12. The method of claim 11, further comprising:

an imaginary part intermediate product calculation operation by which the SIMD hardware processor calculates, in parallel, a first imaginary part product, a second imaginary part product, a third imaginary part product, and a fourth imaginary part product, based on the first complex number, the second complex number, the third complex number, and the fourth complex number;

an imaginary part intermediate sum calculation operation by which the SIMD hardware processor calculates a first imaginary part sum and a second imaginary part sum, based on the first imaginary part product, the second imaginary part product, the third imaginary part product, and the fourth imaginary part product; and an imaginary part result value calculation operation by which the SIMD hardware processor calculates an imaginary part result value based on the first imaginary part sum and the second imaginary part sum, wherein the first imaginary part product is obtained by multiplying a real part of the first complex number and an imaginary part of the third complex number, the second imaginary part product is obtained by multiplying an imaginary part of the first complex number and a real part of the third complex number, the third imaginary part product is obtained by multiplying a real part of the second complex number and an imaginary part of the fourth complex number, and the fourth imaginary part product is obtained by multiplying an imaginary part of the second complex number and a real part of the fourth complex number, wherein the first imaginary part sum is obtained by adding the first imaginary part product and the third imaginary part product, and the second imaginary part sum is obtained by adding the second imaginary part product and the fourth imaginary part product, and wherein the imaginary part result value is obtained by adding the first imaginary part sum and the second imaginary part sum.

13. The method of claim 12, wherein the SIMD hardware processor sequentially processes the real part intermediate product calculation operation, the real part intermediate sum calculation operation, the real part result value calculation operation, the imaginary part intermediate product calculation operation, the imaginary part intermediate sum calculation operation, and the imaginary part result value calculation operation.

14. The method of claim 12, wherein the SIMD hardware processor processes, in parallel, the real part intermediate product calculation operation, and the imaginary part intermediate product calculation operation, wherein the SIMD hardware processor processes, in parallel, the real part intermediate sum calculation operation, and the imaginary part intermediate sum calculation operation, and wherein the SIMD hardware processor processes, in parallel, the real part result value calculation operation, and the imaginary part result value calculation operation.

15. The method of claim 11, wherein the SIMD hardware processor processes, in a fixed-point format, the real part and imaginary part of the first complex number, the real part and imaginary part of the second complex number, the real part and imaginary part of the third complex number, and the real part and imaginary part of the fourth complex number.

16. The method of claim 11, wherein the SIMD hardware processor allocates n bits to each of the real part and imaginary part of the first complex number, the real part and imaginary part of the second complex number, the real part and imaginary part of the third complex number, and the real part and imaginary part of the fourth complex number, and allocates 2n bits to each of the first real part product, the second real part product, the third real part product, the fourth real part product, the first real part sum, the second real part sum, and the result value.

17. A non-transitory computer readable storage medium having stored therein program instructions to cause a hardware processor to implement a method of operating a complex number, the method comprising:

a real part intermediate product calculation operation by which a Single Instruction Multiple Data (SIMD) hardware processor calculates, with respect to received input data, in parallel, a first real part product, a second real part product, a third real part product, and a fourth real part product, based on a first complex number, a second complex number, a third complex number, and a fourth complex number;

a real part intermediate sum calculation operation by which the SIMD hardware processor calculates a first real part sum and a second real part sum, based on the first real part product, the second real part product, the third real part product, and the fourth real part product; and a real part result value calculation operation by which the SIMD hardware processor calculates a real part result value based on the first real part sum and the second real part sum, wherein the first real part product is obtained by multiplying a real part of the first complex number and a real part of the third complex number, the second real part product is obtained by multiplying an imaginary part of the first complex number and an imaginary part of the third complex number, the third real part product is obtained by multiplying a real part of the second complex number and a real part of the fourth complex number, and the fourth real part product is obtained by multiplying an imaginary part of the second complex number and an imaginary part of the fourth complex number, wherein the first real part sum is obtained by adding the first real part product and the third real part product, and the second real part sum is obtained by adding the second real part product and the fourth real part product, wherein the real part result value is obtained by subtracting the second real part sum from the first real part sum, and wherein at least one of the first real part product, the second real part product, the third real part product and the fourth real part product is stored in a register in which one of the first complex number, the second complex number, the third complex number and the fourth complex number is stored.

* * * * *